(12) United States Patent
Ito et al.

(10) Patent No.: US 6,759,647 B2
(45) Date of Patent: Jul. 6, 2004

(54) PROJECTION ENCODER

(75) Inventors: Yoshinori Ito, Nagano-ken (JP); Kazuhiro Hane, Miyagi-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/345,381

(22) Filed: Jan. 16, 2003

(65) Prior Publication Data

US 2003/0155491 A1 Aug. 21, 2003

(30) Foreign Application Priority Data

Feb. 20, 2002 (JP) ........................................ 2002-042478

(51) Int. Cl.[7] ............................ G01D 5/34; G01B 11/14
(52) U.S. Cl. ............................. 250/231.1; 250/237 G; 356/617
(58) Field of Search ......................... 250/231.1, 231.11, 250/231.12, 231.13, 231.14, 231.15, 231.16, 231.17, 231.18; 356/399, 400, 401, 616, 617

(56) References Cited

U.S. PATENT DOCUMENTS

| | | | | |
|---|---|---|---|---|
| 4,499,374 A | * | 2/1985 | Kabaya | 250/237 G |
| 5,155,355 A | * | 10/1992 | Kabaya | 250/237 G |
| 5,279,044 A | * | 1/1994 | Bremer | 33/706 |
| 5,657,125 A | * | 8/1997 | Kato et al. | 356/499 |
| 5,774,219 A | * | 6/1998 | Matsuura | 356/499 |
| 6,384,752 B1 | * | 5/2002 | Suzuki et al. | 341/111 |
| 6,512,222 B2 | * | 1/2003 | Aoki | 250/231.13 |
| 6,610,975 B2 | * | 8/2003 | Ito et al. | 250/231.16 |
| 6,621,068 B2 | * | 9/2003 | Aoki et al. | 250/231.14 |
| 6,635,863 B1 | * | 10/2003 | Nihommori et al. | 250/231.13 |
| 2002/0104960 A1 | * | 8/2002 | Omi | 250/231.13 |

FOREIGN PATENT DOCUMENTS

JP  2000-321097  11/2000

OTHER PUBLICATIONS

U.S. patent application No. 10/002,632, "Optical Encoder", filed Dec. 5, 2001.

* cited by examiner

Primary Examiner—David Porta
Assistant Examiner—David C Meyer
(74) Attorney, Agent, or Firm—Burns, Doane, Swecker & Mathis, L.L.P.

(57) ABSTRACT

In a projection encoder based on a triple-grating concept, a light-transmitting grating group 3 for detecting A- and B-phase signals, a photodiode group 4 for detecting A- and B-phase signals, and a photodiode group 5 for detecting a home position are formed on a movable grating plate 6 of a projection linear encoder 1; and a reflecting grating group 7 for detecting A- and B-phase signals, and a reflecting grating group 8 for detecting the home position are formed on a reflecting grating plate 9.

4 Claims, 9 Drawing Sheets

Fig.1

11: SIGNAL PROCESSING UNIT
12: ARITHMETIC UNIT
13: DISPLAY UNIT
14: LAMP DRIVE UNIT

LIGHT RECEPTIVITY OF Z-PHASE: 8
LIGHT RECEPTIVITY OF Z'-PHASE: 0
DIFFERENCE IN AMOUNT OF LIGHT: 8

(d)

LIGHT RECEPTIVITY OF Z-PHASE: 4
LIGHT RECEPTIVITY OF Z'-PHASE: 3
DIFFERENCE IN AMOUNT OF LIGHT: 1

Fig.8

PROJECTION ENCODER

CROSS-REFERENCE TO RELATED APPLICATIONS

The present application claims priority of Japanese Patent Application No. JP2002-042478, filed in Japan on Feb. 20, 2002, the entire contents of which are hereby incorporated herein by reference.

BACKGROUND OF THE INVENTION

1. Field of the Invention

The present invention relates to a projection encoder based on a triple-grating concept involving the use of a semiconductor substrate or other type of substrate with transmission gratings and photodetectors, and more particularly to a miniature, compactly structured projection encoder capable of accurately generating a home position signal for positional detection.

2. Description of the Related Art

The inventor et al have already proposed, in JP-A 2000-321097 and elsewhere, a projection encoder based on a triple-grating concept. This projection encoder comprises an LED as a light source, a movable plate composed of a semiconductor substrate on which transmission gratings and photodetectors (photodiodes) are integrally formed at a constant pitch, and a reflecting grating plate on which reflecting gratings are formed at a constant pitch; and has a structure in which the movable plate is disposed between the LED and the reflecting grating plate.

In the projection encoder with this structure, the movable plate is moved integrally with the measurement object in the direction in which the transmission gratings and photodiodes are arranged along the direction perpendicular to the optical axis of light emitted by the LED. Light emitted by the LED first strikes the back surface of the movable plate, passes through the transmission gratings on the movable plate, and forms grating stripes on the surface of the reflecting grating plate. Reflecting gratings are also formed at a constant pitch on the reflecting grating plate, making it possible to reflect only those components of light striking the reflecting grating plate that irradiate the reflecting gratings. The reflecting grating image is caused to re-irradiate the movable plate, and is received by photodiodes shaped as vertical stripes and formed at a constant pitch and a constant width.

The photodiodes and transmission gratings shaped as vertical stripes on a movable grating plate function as two grating plates. Consequently, the amount of light received by a photodiode is converted, based on a triple-grating concept involving the use of reflecting gratings, to a sinusoid waveform in accordance with the relative movement of the reflecting grating plate and the movable grating plate. It is thus possible to obtain a pulse signal that corresponds to the relative speed of travel and is based on the photocurrent of the photodiodes, and to calculate the relative speed of travel on the basis of the pulse rate of the pulse signal.

In addition, arranging the photodiodes such that an A-phase signal and a B-phase signal differing in phase by 90 degrees can be obtained makes it possible to determine the movement direction of the movable grating plate on the basis of these two-phase signals.

Thus, the transmission gratings and photodetectors of the projection encoder disclosed in the above laid-open publication and elsewhere are fabricated using semiconductor manufacturing technology, making it possible to manufacture fine-pitch gratings and to obtain high-resolution encoders. In addition, the photodetectors formed as vertical stripes at a constant pitch function as a grating, and the grating itself has a lens effect, so an optical lens system can be dispensed with and the device can be miniaturized. Another feature is that the use of the triple-grating concept prevents resolution from being adversely affected by the width or variability of gaps in such reflecting gratings and transmission gratings, so the adjustment operations needed to ensure the required mounting accuracy for the members with these gratings can be simplified, and the restrictions imposed on the mounting locations can be eased. In addition to this, the interval between the reflecting gratings and transmission gratings can be increased, making it possible to obtain benefits such as achieving better environmental resistance by, for example, housing the reflecting gratings in a protective casing.

A home position, which constitutes the basis for a position or rotation angle, must be detected herein in order to determine the relative position of the movable plate and the reflecting grating plate on the fixed side. Providing the movable plate with integrally formed photodetectors for detecting the home position, and providing the reflecting grating plate with reflecting gratings for detecting the home position have been proposed as a means of detecting the home position. In this case, the contrast of a reflected light image for detecting the home position decreases and the level of the detection signal becomes lower when a wider interval is maintained between the movable plate and reflecting grating plate. As a result, signals for detecting the home position become blocked out by noise, and there is the danger that the home position will be impossible to detect with sufficient accuracy.

It has been proposed to increase the number of reflecting gratings and photodetectors for origin detection, and to use differential detection for the home position in order to stabilize and raise the level of detection signals. However, when an attempt is made to merely use differential detection, the result is an increase in the size of movable plates and reflecting grating plates. In other words, it is impossible to accurately detect a home position when restrictions are imposed on the size of movable plates and reflecting grating plates because it is impossible in this case to increase the number of the photodetectors and reflecting gratings for detecting the home position.

In view of the above, an object of the present invention is to provide a projection encoder that can accurately detect the home position and is based on the triple-grating concept.

Another object of the present invention is to provide a projection encoder that has a small-sized home position detection mechanism, is compactly structured, and is based on the triple-grating concept.

SUMMARY

Aimed at attaining the stated objects, according to an embodiment of the present invention, there is provided a projection encoder, which has a light source, reflecting gratings having a prescribed shape and arranged at a constant pitch, transmission gratings having a prescribed shape and arranged at a constant pitch, and photodetectors for receiving a reflected light image that is emitted by the light source, transmitted by the transmission gratings, and reflected by the reflecting gratings, with at least the relative movement position of the reflecting gratings and transmission gratings being detected based on a detection signal obtained from the photodetectors, comprising:

a reflecting grating plate on which the reflecting gratings are formed, a substrate on which the transmission gratings and the photodetectors are formed, and a home position detection mechanism for detecting a home position of the reflecting grating plate and the substrate; wherein the home position detection mechanism has
a reflecting grating region designed for detecting the home position and formed on the reflecting grating plate; and
a photodetector region designed for detecting the home position and formed on the substrate; and wherein
nonreflecting gratings and reflecting gratings of constant width are arranged in accordance with an M-series arrangement pattern in the reflecting grating region for detecting the home position;
Z-phase photodetectors and Z'-phase photodetectors of constant width for obtaining Z-phase signals and Z'-phase signals differing in phase are arranged in accordance with the M-series arrangement pattern in the photodetector region for detecting the home position; and
a positional relation of the reflecting grating region for detecting the home position and the photodetector region for detecting the home position is set in a manner such that the reflected light image reflected by the reflecting grating region for detecting the home position can be received in the photodetector region for detecting the home position.

Adopting an M-series arrangement pattern causes the difference between the amount of light received by a Z-phase photodetector and the amount of light received by a Z'-phase photodetector to be at a maximum when there is a match between the arrangement pattern in the reflecting grating region for detecting the home position and the arrangement pattern in the photodetector region for detecting the home position, and brings the difference between the amounts of light substantially close to zero when the two arrangement patterns do not match. Consequently, a home position signal with a high S/N ratio can be consistently produced by taking the difference in the detection signals from the Z-phase photodetectors and Z'-phase photodetectors.

In this arrangement, it is possible to form on the substrate a transmitting region in which the transmission gratings are arranged at a constant pitch, a light-receiving region in which the photodetectors are arranged at a constant pitch on one side of the transmitting region, and a photodetector region for detecting the home position in which the Z-phase photodetectors and Z'-phase photodetectors are disposed at a constant pitch on the other side of the transmitting region. In this case, the reflecting grating plate should be provided with a reflecting grating region in which the reflecting gratings are arranged at a constant pitch in positions that can be disposed facing the light-receiving region, and a reflecting grating region for detecting the home position in which the reflecting gratings and nonreflecting gratings are arranged at a constant pitch in positions that can be disposed facing the photodetector region for detecting the home position.

In addition, the reflecting gratings and nonreflecting gratings arranged at a constant pitch in the reflecting grating region designed for detecting the home position and formed on the reflecting grating plate should be composed, respectively, from bisected reflecting gratings and bisected nonreflecting gratings that have half the width and are disposed at half the pitch in order to enhance the contrast of the reflected light image for detecting the home position.

The home position detection mechanism in the projection encoder of the present invention further comprises a signal processing unit for detecting the home position on the basis of the differential signal between a detection signal produced by the Z-phase photodetectors and a detection signal produced by the Z'-phase photodetectors.

DESCRIPTION OF THE PREFERRED EMBODIMENTS

Embodiments of a projection linear encoder based on the triple-grating concept obtained by applying the present invention will now be described with reference to the drawings.

Figure 1:
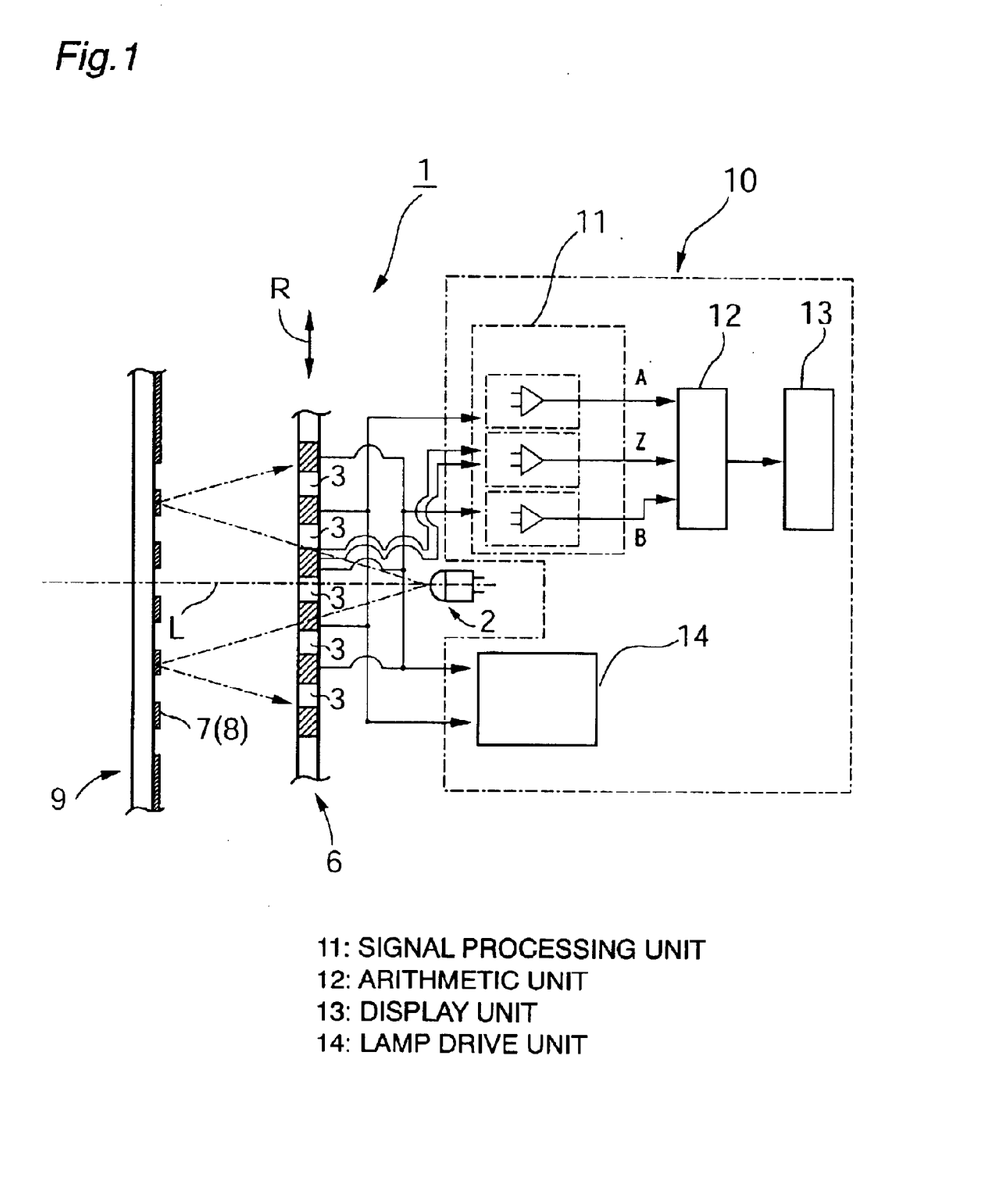
FIG. 1 is a schematic structural diagram depicting a projection linear encoder based on the triple-grating concept obtained by applying the present invention.
Figure 2:
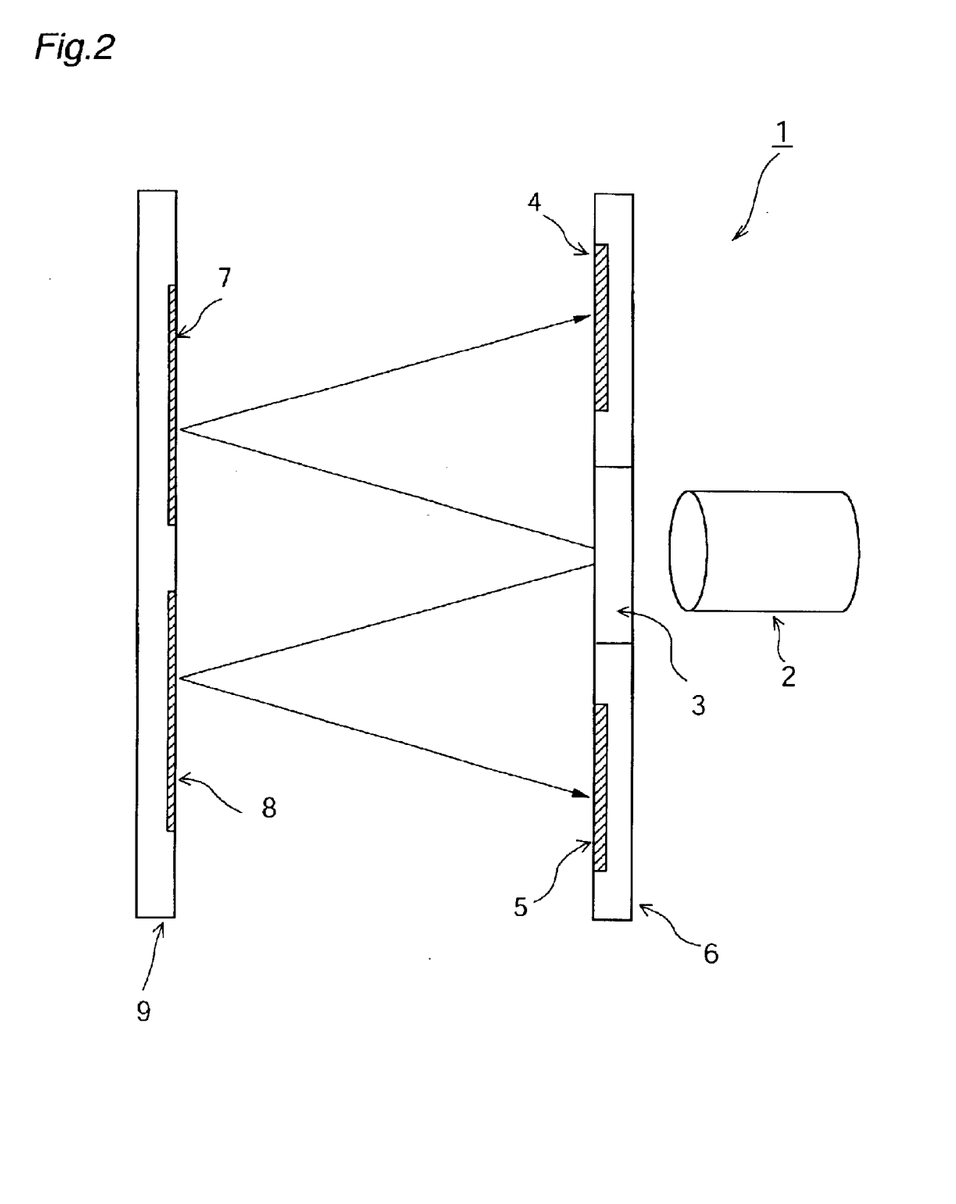
FIG. 2 is a lateral structural diagram depicting the mutual arrangement of the movable grating plate, reflecting grating plate, and light source in FIG. 1.

FIG. 1 is a schematic structural diagram depicting the projection linear encoder of the present example. FIG. 2 is a lateral structural diagram of the principal portion thereof. As can be seen in the drawings, the projection linear encoder 1 essentially comprises an LED, halogen lamp, or other light source 2; a movable grating plate 6 comprising a semiconductor substrate on which a transmission grating group 3 and photodiode groups 4 and 5 are integrally formed; a reflecting grating plate (fixed grating plate) 9 in which reflecting grating groups 7 and 8 are formed on the surface; and a control circuit unit 10. Light emitted by the light source 2 is transmitted by the transmission grating group 3 formed on the movable grating plate 6, and is directed to the reflecting grating groups 7 and 8 on the reflecting grating plate 9. The reflected light image reflected by the reflecting grating groups 7 and 8 is received by the photodiode groups 4 and 5, and the detection signals of the photodiode groups 4 and 5 are fed to the control circuit unit 10.

The control circuit unit 10 comprises a signal processing unit 11 for forming an A-phase signal and a B-phase signal shifted in phase by ¼λ, as well as a Z-phase signal for indicating the home position of the movable grating plate 6 on the basis of the detection signals from the photodiode groups 4 and 5; an arithmetic unit 12 for calculating the travel speed, travel direction, travel position, and other types of travel information about the movable grating plate 6 on the basis of the A-, B-, and Z-phase signals; a display unit 13 for displaying the calculation results; and a lamp drive unit 14 for the feedback control of the drive for the light source 2.

Figure 3:
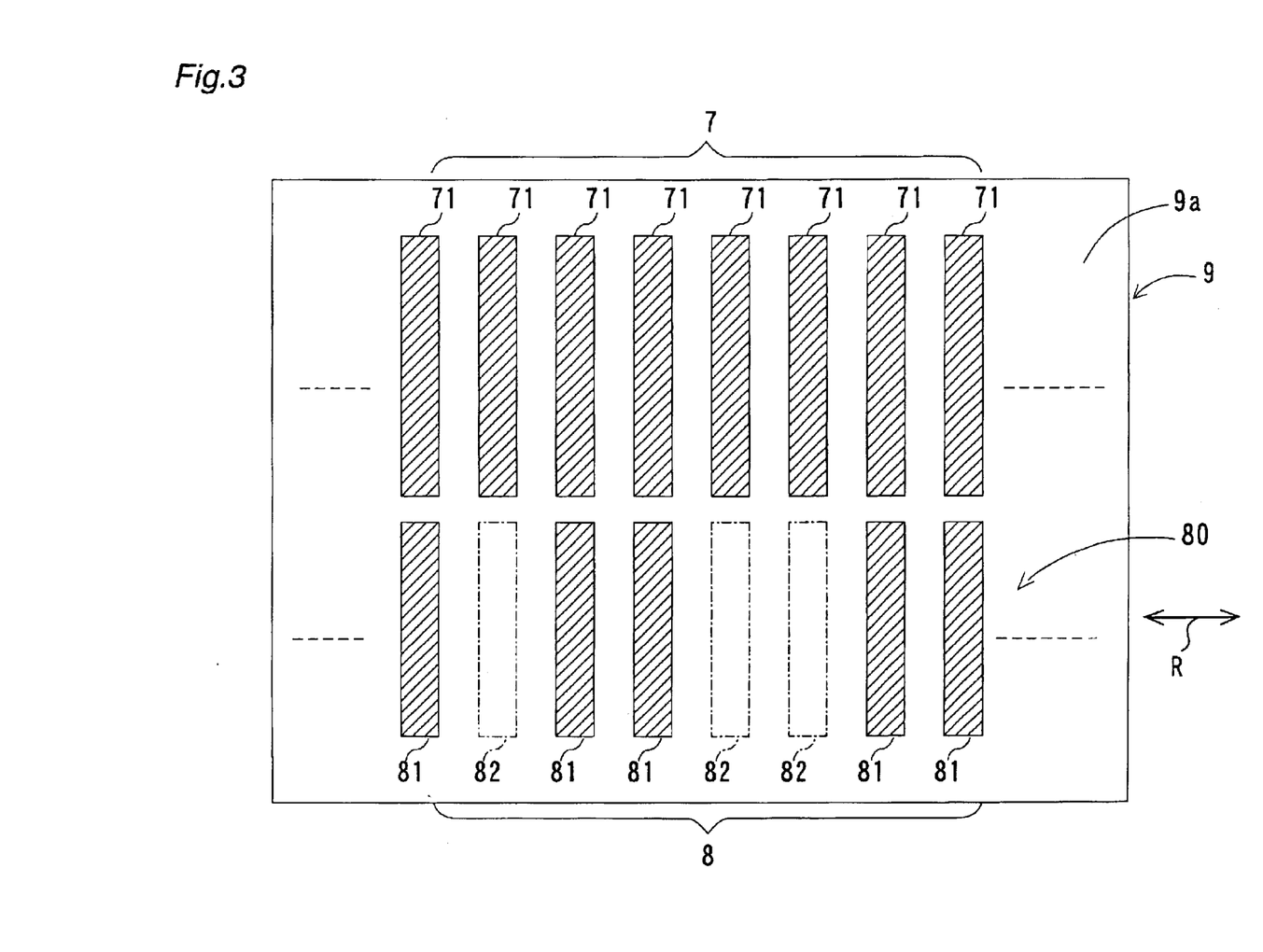
FIG. 3 is a diagram depicting an arrangement pattern of the reflecting gratings formed on the reflecting grating plate in FIG. 1.

FIG. 3 is a diagram depicting an arrangement pattern of the reflecting gratings formed on the surface of the reflecting grating plate 9. A surface 9a of the reflecting grating plate 9 is oriented perpendicular to the optical axis L of light emitted by the light source 2, and parallel to the travel direction R of the movable grating plate 6. Reflecting gratings 71 of constant width are arranged in the travel direction R at a constant pitch in a surface portion (top portion in the drawing) that is disposed on one side in the direction orthogonal to the travel direction R on the surface 9a. In addition, reflecting gratings 81 and nonreflecting gratings 82 of constant width are disposed in accordance with an M-series arrangement pattern in another portion (bottom portion in the drawing) of the surface 9a. In the present example, the reflecting grating plate 9 is formed from a transparent substrate, a reflecting film that defines the reflecting gratings 81 is therefore formed alone on the surface thereof, and nonreflecting gratings 82 indicated by the imaginary lines in the drawing are depicted for the sake of convenience to facilitate understanding.

Figure 4:
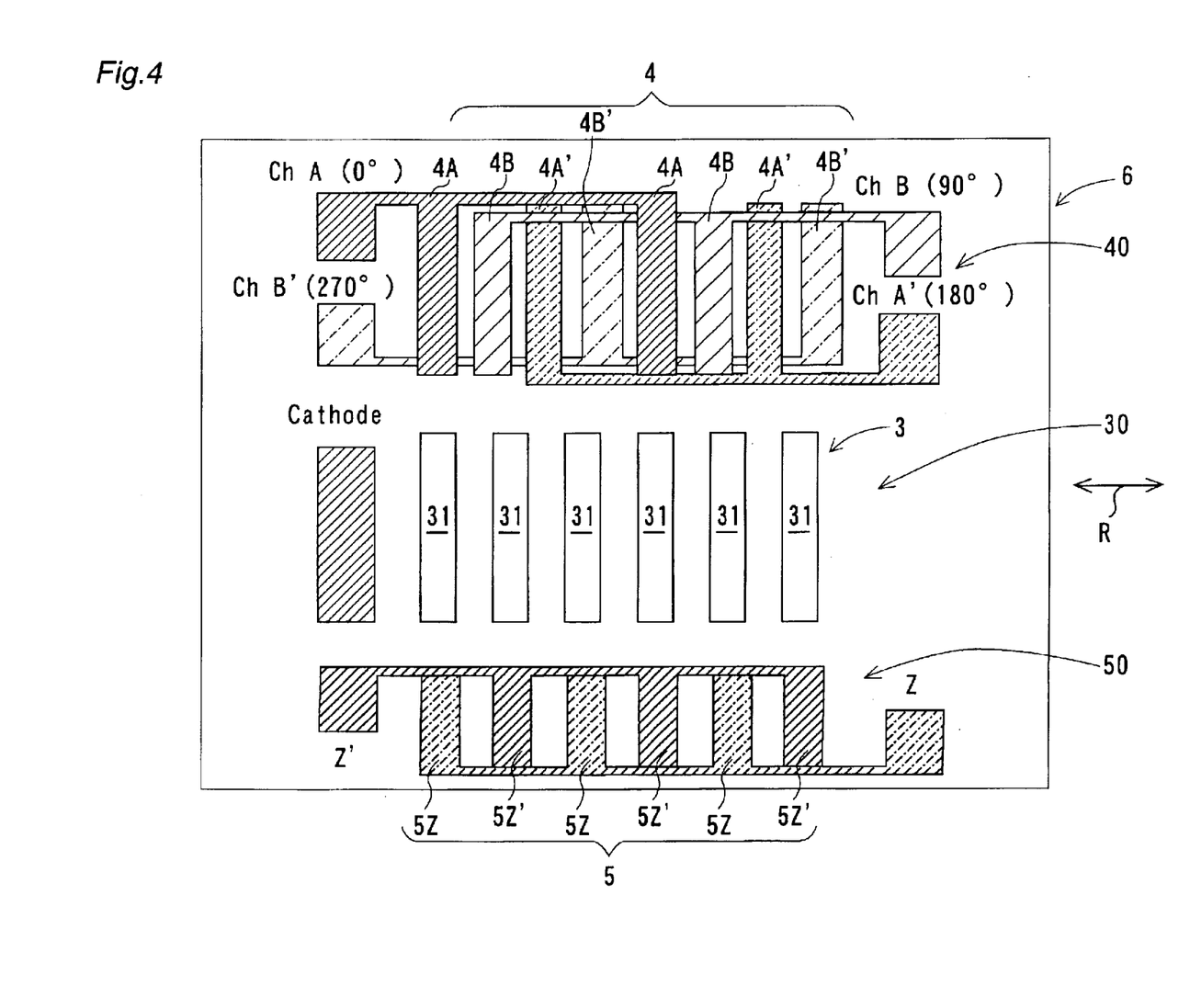
FIG. 4 is a diagram depicting an arrangement pattern of a group of photodiodes and transmission gratings formed on the movable grating plate in FIG. 1.

FIG. 4 is a diagram depicting the transmission grating group 3 and photodiode groups 4 and 5 formed on the movable grating plate 6 in a facing relationship with the reflecting grating plate 9. As shown in this drawing, the movable grating plate 6 is provided with a light-transmitting region 30 in the central portion in the direction orthogonal to the travel direction R thereof, and the light-transmitting region 30 is composed of a transmission grating group 3 in which transmission gratings 31 of constant width are arranged in the travel direction R at a constant pitch. A light-receiving region 40 comprising a photodiode group 4 for detecting A- and B-phase signals is formed on one side (top side in the drawing) of the light-transmitting region 30. The photodiode group 4 of the present example comprises photodiodes 4A for detecting A-phase signals; photodiodes 4B for detecting B-phase signals; photodiodes 4A' for detecting A'-phase signals, which are the inverse of the A-phase signals; and photodiodes 4B' for detecting B'-phase signals, which are the inverse of the B-phase signals. These photodiodes are arranged in the travel direction R at the same pitch and in the same width.

A photodetector region 50 designed for detecting the home position and composed of a photodiode group 5 for detecting Z-phase signals is formed on the opposite side (bottom side in the drawing) from the transmission gratings 31. The photodiode group 5 of the present example comprises photodiodes 5Z for detecting Z-phase signals, and photodiodes 5Z' for detecting Z'-phase signals, which are the inverse of the Z-phase signals. These photodiodes are arranged in the travel direction R at the same pitch and in the same width.

Figure 5:
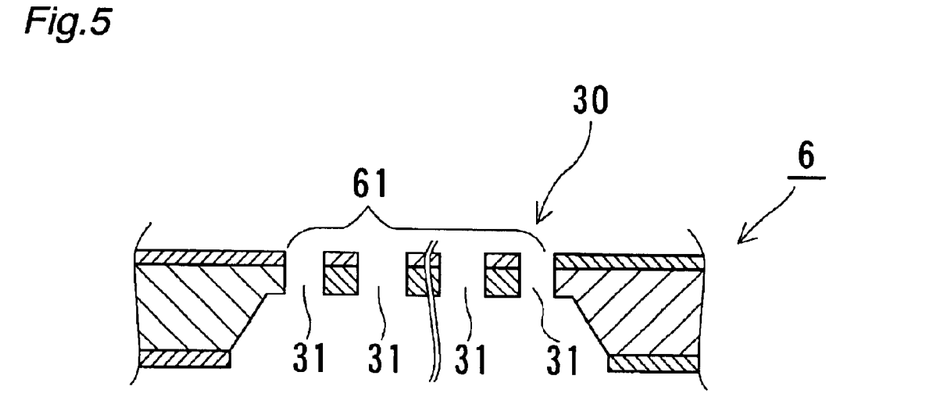
FIG. 5 is an enlarged partial enlarged cross-sectional view depicting the portion in which transmission gratings are formed on the movable grating plate in FIG. 1.

Next, FIG. 5 is an enlarged partial cross-sectional view of the light-transmitting region 30 formed in the central portion of the movable grating plate 6. As can be seen from the drawing, the light-transmitting region 30 of the present example is configured in a manner such that transmission gratings 31 of constant width are formed as slits at a constant pitch by means of ICP or another type of dry etching in a thin-film portion 61, which is formed by performing wet etching on the reverse side of the movable grating plate 6.

Figure 6:
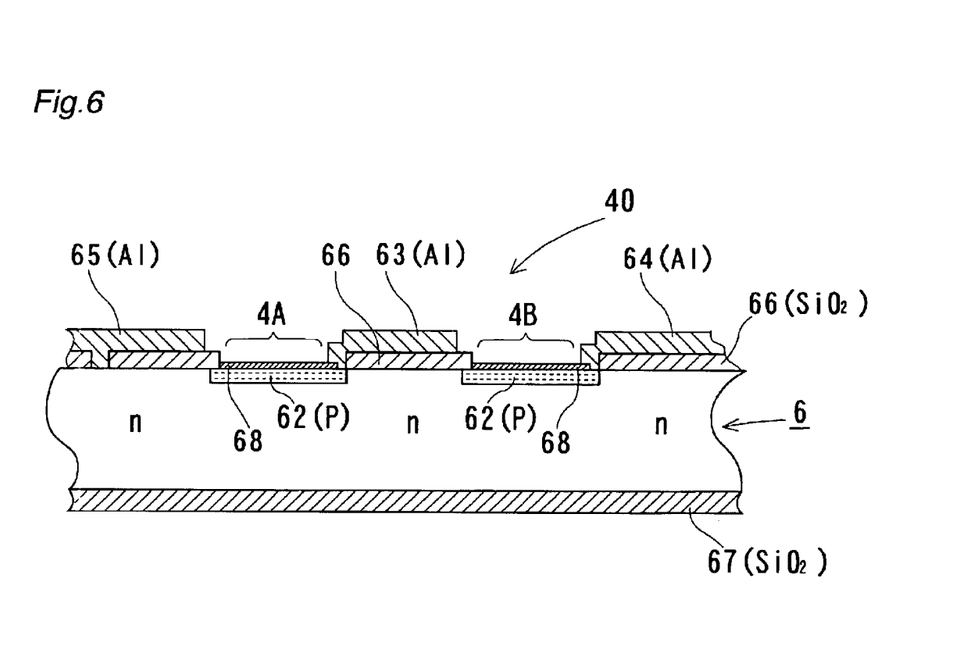
FIG. 6 is an enlarged partial cross-sectional view depicting the portion in which photodiodes are formed on the movable grating plate in FIG. 1.

FIG. 6 is a fragmentary enlarged cross-sectional view depicting the photodiodes 4A and 4B of the photodiode group 4 integrally formed in the light-receiving region 40 of the movable grating plate 6. The same applies to the photodiode group 5. As can be seen from the drawing, the integrally formed elements are pn-junction photodiodes 4A and 4B provided with boron-doped layers 62, which are formed by introducing boron through the surface of the movable grating plate 6 composed of a silicon substrate. Aluminum electrode wiring layers 63 and 64 are connected to the boron-doped layers 62 of the photodiodes 4A and 4B, and a common aluminum electrode layer 65 is connected to the movable grating plate 6 on the side of the n-layer. The movable grating plate 6 and the electrode wiring layers 63 and 64 are insulated from each other by an insulating layer 66 comprising a silicon oxide film. In addition, the exposed surface of the movable grating plate 6 is covered by a silicon oxide film 67 in order to ensure adequate durability. Similarly, the surface of the boron-doped layer 62 is covered by a silicon oxide film 68.

(Home Position Detection Mechanism)

Following is a description of the principle for detecting a home position signal (Z-phase signal) in the projection linear encoder of the present example. First, the home position detection mechanism incorporated into the projection linear encoder of the present example comprises a photodiode group 5 (photodiodes 5Z and 5Z' for Z-phase detection) formed in the photodetector region 50, which is designed for detecting the home position and is provided to the movable grating plate 6; a reflecting grating 81 and a nonreflecting grating 82 formed in a reflecting grating region 80, which is designed for detecting the home position and is provided to the reflecting grating plate 9; and a signal processing unit 11.

In the present example, an M-series arrangement pattern is used to detect the home position. For example, a 15-element M-series arrangement pattern such as the one described below may be used.

000100110101111

Figure 7:
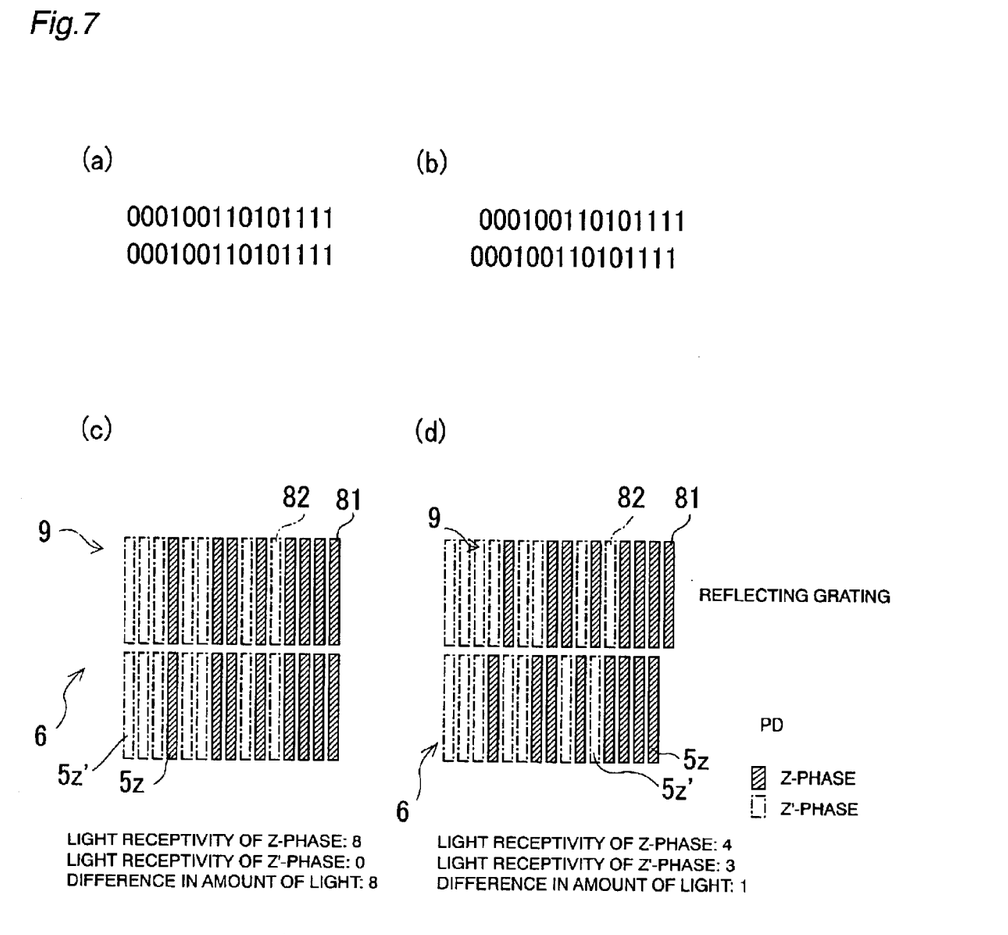
FIG. 7 is a diagram depicting the principle for detecting the home position in the projection linear encoder in FIG. 1.

In the case in which the M-series arrangement pattern comprises two groups disposed above and below in a manner such that the digits of the top- and bottom-tier groups correspond to each other, as shown in FIG. 7(a), all the digits are combined together as pairs of 0's and pairs of 1's. When the bottom-tier group is shifted by a single digit in relation to the top-tier group, as shown in FIG. 7(b), a substantially identical number is established for the number of digits that combine to form pairs of 1's and for the number of digits that combine to form a "1" and a "0."

In the present example, the gratings 81 and 82 in the reflecting grating region 80 designed for detecting the home position and provided to the reflecting grating plate 9 are arranged in a manner such that a "1" in the M-series arrangement pattern is made to correspond to a reflecting grating 81, and a "0" is made to correspond to a nonreflecting grating 82. Similarly, the photodiodes 5Z for Z-phase detection and the photodiodes 5Z' for Z'-phase detection in the photodetector region 50 designed for detecting the home position and provided to the movable grating plate 6 are arranged in a manner such that a "1" in the M-series arrangement pattern is made to correspond to a photodiode 5Z, and a "0" is made to correspond to a photodiode 5Z'. Specifically, the reflecting gratings 81 and nonreflecting gratings 82 for detecting the home position are arranged on the reflecting grating plate 9, and the photodiodes 5Z and 5Z' for detecting the home position are disposed on the movable grating plate 6, as shown in FIG. 7(c). FIG. 7(d) shows a relation between the reflecting grating plate 9 and movable grating plate 6 that corresponds to a case in which the arrangement pattern is shifted by one digit, as in FIG. 7(b).

The description given herein below will be limited to the intensity of light obtained when light reflected by a reflecting grating 81 is received by a photodiode 5Z or 5Z', which is disposed facing the reflecting grating 81. In the case shown in FIG. 7(c), all eight photodiodes 5Z for Z-phase detection receive light, whereas the number of locations at which light is received by the photodiodes 5Z' for Z'-phase detection is zero. Consequently, the difference in the amount of light between the photodiodes 5Z for Z-phase detection and the photodiodes 5Z' for Z'-phase detection will be 8, assuming that the amount of light received by a single photodiode is equal to 1. By contrast, the amount of light received by the photodiodes 5Z for Z-phase detection in the case shown in FIG. 7(d) will be equal to 4, the amount of light received by the photodiodes 5Z' for Z'-phase detection will be equal to 3, and the difference between these amounts of light will be equal to merely 1. Consequently, generating a differential signal based on the detection signal obtained from the photodiodes 5Z for Z-phase detection and the detection signal obtained from the photodiodes 5Z' for Z'-phase detection makes it possible to generate the maximum-level detection signal at the position in which the differential signal is at its maximum, that is, at the home position (position of the movable grating plate shown in FIG. 7(c)).

Figure 8:
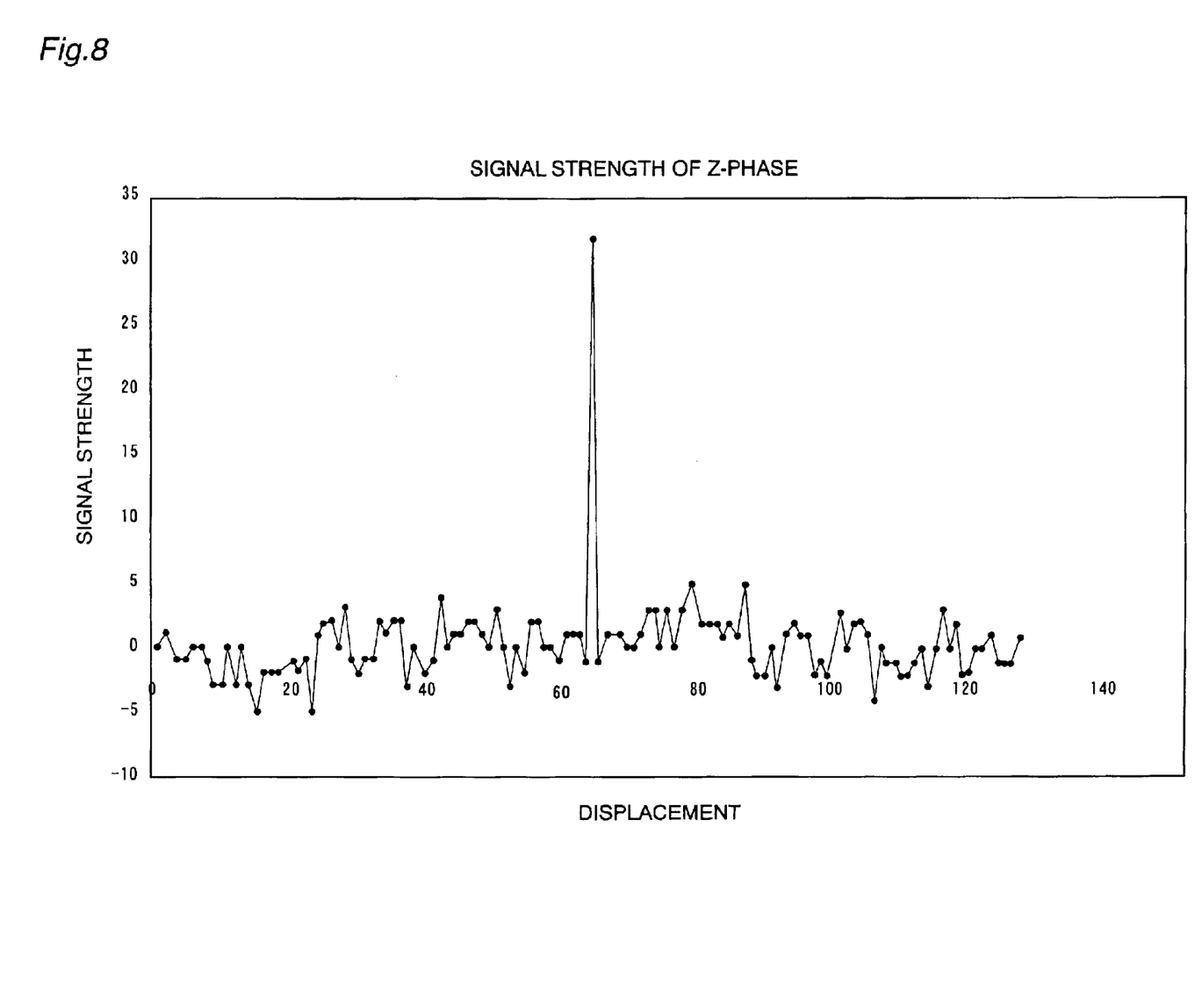
FIG. 8 is a graph in which the intensity of differential signals from the Z-phase detection photodiodes and Z'-phase detection photodiodes in the projection linear encoder in FIG. 1 are plotted in accordance with the movement of the movable grating plate.

The M-series arrangement pattern is a (2 n−1) periodic pattern (where n is a positive integer). As an example, an M-series arrangement pattern comprising 63 digits (n=6) was adopted as the arrangement pattern of the photodiodes 5Z and 5Z' for detecting the home position, and as the arrangement pattern of the reflecting gratings 81 and nonreflecting gratings 82 for detecting the home position. The graph in FIG. 8 is one in which the intensity of the differential signal obtained in this case for the photodiodes 5Z for Z-phase detection and the photodiodes 5Z' for Z'-phase detection is plotted in accordance with the movement of the movable grating plate 6.

Figure 9:
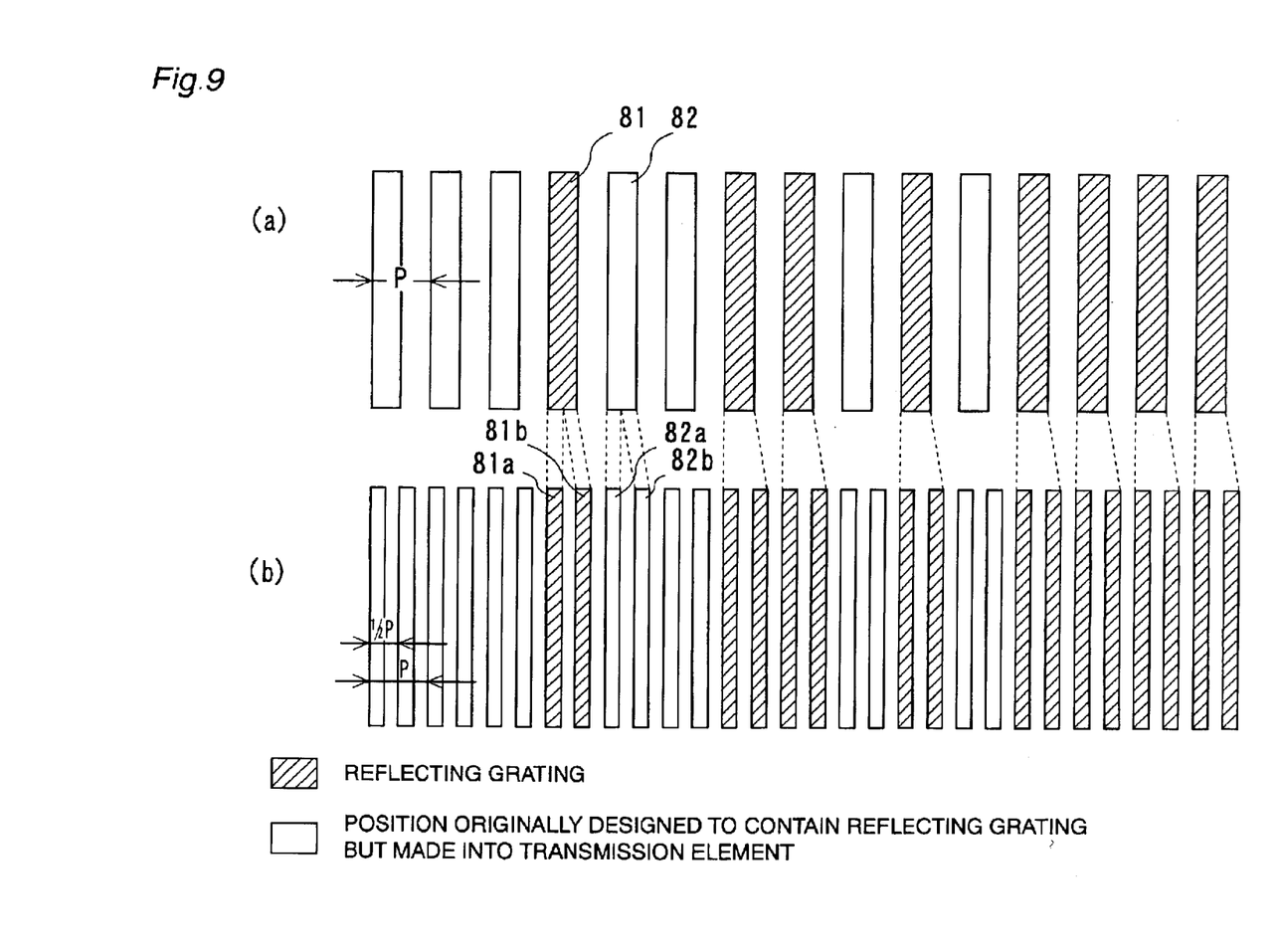
FIG. 9 is a diagram depicting arrangement patterns of the reflecting gratings and nonreflecting gratings that can be formed in the reflecting grating region designed for detecting the home position and provided to the reflecting grating plate of FIG. 1.

It is also possible to adopt the configuration shown in FIG. 9 as the arrangement pattern of the reflecting gratings 81 and nonreflecting gratings 82, which are designed for detecting the home position and are provided to the reflecting grating plate 9. According to the triple-grating concept, a high-contrast reflected light image can be obtained if the relation 2P1=P=2P2 is satisfied, where P1, P, and P2 are the respective pitches of a transmission grating (object grating), reflecting grating (pupil grating), and photodetector (image grating). In view of this fact, a higher-contrast origin signal can be obtained from an arrangement pattern that results, for example, from bisecting the theoretical arrangement pattern of the reflecting gratings 81 and nonreflecting gratings 82 shown in FIG. 7(c). Specifically, it is possible to use an arrangement pattern in which reflecting gratings 81 and nonreflecting gratings 82 based on the M-series arrangement pattern shown in FIG. 9(a) are replaced, respectively, with bisected reflecting gratings 81a and 81b as well as bisected nonreflecting gratings 82a and 82b that have half the width and are arranged at half the pitch, as shown in FIG. 9(b).

(Detection Operation)

In the projection linear encoder 1 configured in accordance with the present example, the movable grating plate 6 is formed monolithically with the measurement object (not shown) and is moved in the direction in which the slits and photodiodes are arranged along the direction orthogonal to the optical axis L. Light emitted by the light source 2 first strikes the back surface of the movable grating plate 6, passes through the transmission grating group 3 formed on the movable grating plate 6, and forms grating stripes on a reflecting grating plate 9 disposed at a fixed position. Reflecting grating groups 7 and 8 of the same width are also formed at a constant pitch on the reflecting grating plate 9, making it possible to reflect only those components of light striking the reflecting grating plate 9 that irradiate the reflecting gratings 7 and 8. The reflecting grating image is caused to re-irradiate the movable grating plate 6, and is received by the photodiode groups 4 and 5.

The photodiodes 4 and the transmission grating group 3 shaped as vertical stripes on the movable plate 6 function as two grating plates. Consequently, the amount of light received by the photodiode group 4 is converted, based on the triple-grating concept involving the use of the reflecting grating group 7, to a sinusoid waveform in accordance with the relative movement of the reflecting grating group 7 on the fixed side and the transmission grating group 3 on the moving side. It is thus possible to obtain a pulse signal that corresponds to the relative speed of travel and is based on the photocurrent of the photodiode group 4, and to calculate the relative speed of travel on the basis of the pulse rate of the pulse signal.

In addition, a highly accurate A-phase signal can be obtained based on the differential output of the photodiodes 4A and 4A', and a highly accurate B-phase signal can be obtained based on the differential output of the photodiodes 4B and 4B'. The travel direction of the movable grating plate 6 can be determined based on these two-phase signals.

Another feature of the projection linear encoder 1 of the present example is that a Z-signal for detecting the home position of the movable grating plate 6 can be obtained together with the A- and B-phase signals. The detection signals are obtained from the photodiodes 5Z and 5Z' during the movement of the movable grating plate 6, as described with reference to FIGS. 7 and 8. The differential signal of the photodiodes 5Z and 5Z' reaches its maximum level, and a Z-phase signal is obtained with high accuracy and reliability when the movable grating plate 6 reaches the home position.

(Other Embodiments)

Although the above example was described with reference to a case in which the reflecting grating plate having reflecting gratings was on the fixed side, it is also possible to place the reflecting grating plate on the moving side, and the movable plate on the fixed side.

The light source used may also be an LED, laser light source, halogen lamp, or other type of light source.

Although the above example was described with reference to a linear encoder, the present invention can be adapted in the same manner to a rotary encoder. In this case, the light-transmission gratings and photodiodes should be formed at constant angular intervals in the circumferential direction.

As described above, an embodiment of the present invention resides in a projection encoder in which reflecting gratings and transmission gratings are used on the basis of a triple-grating concept, and a reflecting grating image that allows information about the relative movement of these gratings to be detected is received by photodetectors, wherein this encoder is configured in a manner such that a photodetector region for detecting the home position is formed on a substrate provided with transmission gratings, that a reflecting grating region for detecting the home position is formed on a reflecting grating plate provided with reflecting gratings, that photodiodes for Z-phase detection and photodiodes for Z'-phase detection are arranged in accordance with an M-series arrangement pattern in the photodetector region for detecting the home position, and that the reflecting gratings and nonreflecting gratings are arranged in the same manner in accordance with the M-series arrangement pattern in the reflecting grating region for detecting the home position.

Consequently, a signal designed for detecting the home position and provided with a high signal level at the home position can be generated in accordance with the present invention by obtaining a differential signal from photodiodes for Z-phase detection and photodiodes for Z'-phase detection in applications that involve detecting the home position. It is therefore possible to accurately detect the home position without any effect from variations in the amount of light or the like. It is also possible to construct a compact, miniature projection encoder that has home position detection functionality.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A projection encoder which has a light source, reflecting gratings having a prescribed shape and arranged at a constant pitch, transmission gratings having a prescribed shape and arranged at a constant pitch, and photodetectors for receiving a reflected light image that is emitted by the light source, transmitted by the transmission gratings, and reflected by the reflecting gratings, with at least the relative movement position of the reflecting gratings and transmission gratings being detected based on a detection signal obtained from the photodetectors, the projection encoder comprising:

a reflecting grating plate on which the reflecting gratings are formed;

a substrate on which the transmission gratings and photodetectors are formed; and a home position detection mechanism for detecting the home position of the reflecting grating plate and the substrate;

said home position detection mechanism comprising:

a reflecting grating region designed for detecting the home position and formed on the reflecting grating plate; and a photodetector area designed for detecting the home position and formed on the substrate; wherein nonreflecting gratings and reflecting gratings of constant width are arranged in accordance with an M-series arrangement pattern in the reflecting grating region for detecting the home position;

Z-phase photodetectors and Z'-phase photodetectors of constant width for obtaining Z-phase signals and Z'-phase signals differing in phase are arranged in accordance with the M-series arrangement pattern in the photodetector region for detecting the home position; and a positional relation of the reflecting grating region for detecting the home position and the photodetector region for detecting the home position is set in a manner such that the reflected light image reflected by the reflecting grating region for detecting the home position can be received in the photodetector region for detecting the home position.

2. The projection encoder according to claim 1, wherein the substrate has formed thereon a transmitting region in which the transmission gratings are arranged at a constant pitch, a light-receiving region in which the photodetectors are arranged at a constant pitch on one side of the transmitting region, and a photodetector region for detecting the home position in which the Z-phase photodetectors and Z'-phase photodetectors are disposed at a constant pitch on the other side of the transmitting region; and the reflecting grating plate has formed thereon a reflecting grating region in which the reflecting gratings are arranged at a constant pitch in positions that can be disposed facing the light-receiving region, and a reflecting grating region for detecting the home position in which the reflecting gratings and nonreflecting gratings are arranged at a constant pitch in positions that can be disposed facing the photodetector region for detecting the home position.

3. The projection encoder according to claim 1, wherein the reflecting gratings and nonreflecting gratings arranged at a constant pitch in the reflecting grating region designed for detecting the home position and formed on the reflecting grating plate are composed, respectively, from bisected reflecting gratings and bisected nonreflecting gratings that have half the width and are disposed at half the pitch.

4. The projection encoder according to claim 1, wherein the home position detection mechanism comprises a signal processing unit for detecting the home position on the basis of the differential signal between a detection signal produced by the Z-phase photodetectors and a detection signal produced by the Z'-phase photodetectors.

* * * * *